Jan. 31, 1950 — J. H. McILROY — 2,496,059
TWIN LENS REFLEX CAMERA
Filed Sept. 7, 1948 — 3 Sheets-Sheet 2

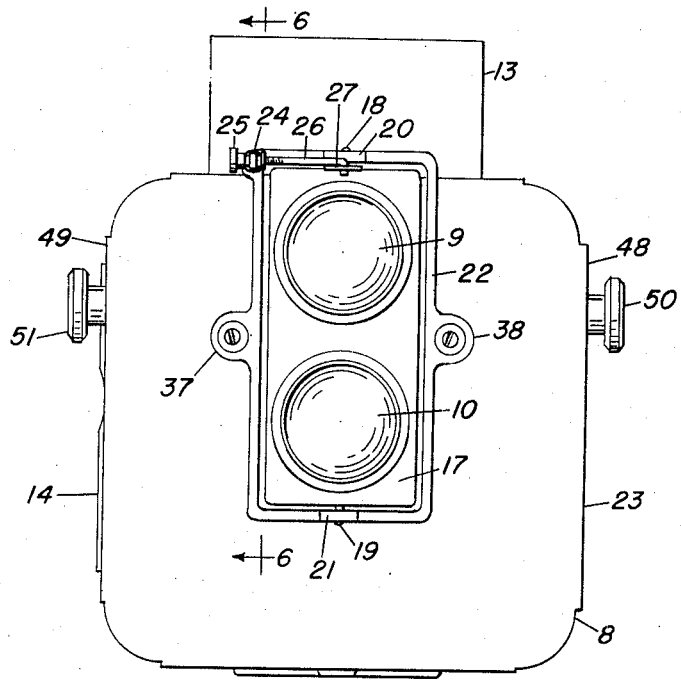

INVENTOR.
JOHN H. McILROY
BY Everett N. Curtis
ATTORNEY

Jan. 31, 1950 J. H. McILROY 2,496,059
TWIN LENS REFLEX CAMERA
Filed Sept. 7, 1948 3 Sheets-Sheet 3

INVENTOR.
JOHN H. McILROY
BY Everett N. Curtis
ATTORNEY

Patented Jan. 31, 1950

2,496,059

UNITED STATES PATENT OFFICE 2,496,059

TWIN LENS REFLEX CAMERA

John H. McIlroy, San Diego, Calif., assignor to Macvan Manufacturing Company, San Diego, Calif., a corporation of California Application September 7, 1948, Serial No. 48,001

3 Claims. (Cl. 95—44)

My invention relates to photographic cameras, particularly coordinated twin lens reflex cameras having automatic means for the avoidance of parallax; and its objects are to provide a better mechanism for operatively connecting the adjustment of the viewing screen of the finder with the means of actuating the focusing controls, so that the same scene is reproduced simultaneously upon both the area of the said screen and that of the sensitized film or plate, irrespective of the distance away of the subject from the camera; to bring about and maintain a better focus of the exposure lens so as more sharply to define the subject to be photographed; to provide a camera of this character in which the axes of both the finder lens and the exposure lens while being focused are maintained constantly in exact parallel relation and in which the viewing screen is at the same time synchronized with said lenses so as to display precisely the same image as that received upon the surface of the sensitized film or plate; to provide a single manually manipulated means for controlling the actuating mechanism for focusing control, together with coordinating mechanism for adjusting the viewing screen; to provide a film or plate holder which may be set at any desired angle without having to turn the camera from its upright position, and which when so set may be locked in place; to render the parts readily accessible for inspection, adjustment, removal, replacement, restoration or repair; and in general to provide an apparatus which is economical of construction, efficient in action and of prolonged life and durability. My invention further consists of other novel features of construction, and combinations and arrangements of parts, illustrated in the drawing and more particularly hereinafter described and claimed.

Attention is hereby directed to the accompanying drawing, illustrating a preferred form of my invention, in which similar numerals of designation refer to similar parts throughout the several views, and in which—

Figure 1 is a front elevation of the camera, looking directly into the finder and exposure lenses thereof, and showing the viewing hood at the top;

Fig. 2 is a side elevation of the camera shown in Fig. 1;

Figure 3:
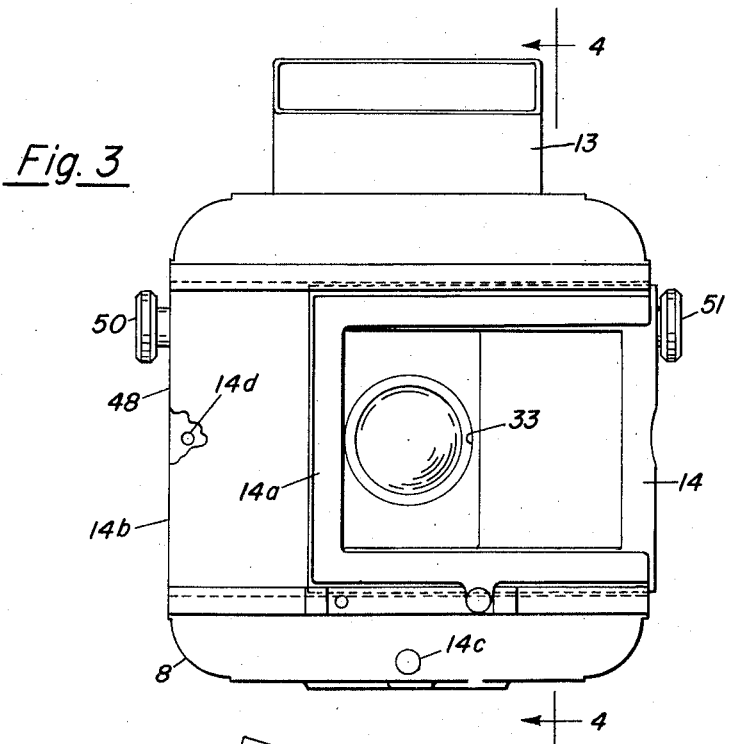
Fig. 3 is a rear elevation of said camera.

Referring to the drawing, the camera there shown comprises the case 8, finder lens 9, exposure lens 10, bellows 11 and 12, hood 13 and plate holder 14. Connecting the barrels 15 and 16 of the lenses 9 and 10 to the front ends of said bellows is the plate 17, pivotally secured top and bottom by pins 18 and 19 to lugs 20 and 21 to the rectangular frame 22; the rear ends of said bellows being connected to the outer face of the adjacent front wall 23 of the case 8. Mounted upon an upper corner of the frame 22 and extending outwardly therefrom is the post 24, through which extends laterally and in threaded engagement therewith the micrometer screw 25, whose extended end 26 is pivotally connected to the protruding lip 27 secured to the top of plate 17 adjacent to the pin 18, and serves to turn on a vertical axis both of the lenses carried upon said plate into desired adjusted angular position.

Extending through the front wall 23 of the case 8, and registering with the rear ends of the bellows 11 and 12 are the circular openings 28 and 29, located one above the other; the opening 28 opening into the hollow of said case, and the opening 29 registering with the truncated open end 30 of the cone 31 affixed to the inner face of the wall 23. As shown, the cone 31 extends entirely across the hollow of the case 8 from front wall 23 to rear wall 32 thereof; the enlarged flaring open end 33 of said cone registering with the circular opening 34 through said wall 32, and also registering with the opening 35 in the inner wall of plate holder 14. Preferably, the ends of the said cone are made to register with, and to turn in, rings 31a and 31b, connected to the front and rear walls 23 and 32, respectively, of the case 8. The wall of the cone 31 is of such material and thickness as to render the same impervious to the transmission of light coming from the interior of the case 8, while permitting free passage of rays of light coming from the exposure lens 10 and cast upon the sensitized film or plate of the plate holder 14.

Integral with each upright side of the frame 22 are the ears 37 and 38, to which are firmly secured the lens focusing rods 39 and 40, respectively, each mounted to slide forward and back within the passageway 41 of a hollow casting 42, located inside of the case 8, and securely affixed to the front wall 23 thereof, outside of the cone 31. The top portion of each of said rods is provided with a rack 43 positioned to mesh with a pinion 44a mounted to turn upon a counter shaft 44 journalled in bearings in an upright clevis extension 45 of the casting 42; the said pinion also meshing with the gear 46, cut within or mounted upon the shaft 47; which shaft is also journalled in bearings in said extension. Preferably, to prevent either of the racks 43 from being moved outwardly out of engagement with its pinion 44a, I supply the stop pin 43a, the shank of which passes through the inner end of the rack just beyond the last tooth therein and is embedded in the wall of the adjacent focusing rod, and the head of which pin rising above the rack prevents disengagement of said pinion and rack. The said shaft 47, thus engaging with a twin train of gears which serves to activate at the same time the rods 39 and 40, extends across the entire width of the case 8, and is journalled near its ends in bearings in the side walls 48 and 49 of said case; the said ends extending outwardly beyond said sides and having mounted thereon the circumferentially knurled handles 50 and 51, which handles furnish a convenient means of manually turning the said shaft and focusing the lenses accordingly.

Also secured to one of the countershafts 44 and turning therewith is the cam 44b, the periphery of which is shaped and positioned to engage with the heel 52 of the cam follower 53; the upper end of said follower being mounted upon the protruding end of one of the pair of horizontally disposed trunnions or shafts 55 journalled in the ends of a pair of lugs 57, 57, integral with the sides of the hood 13, and downwardly projecting therefrom.

Figure 4:
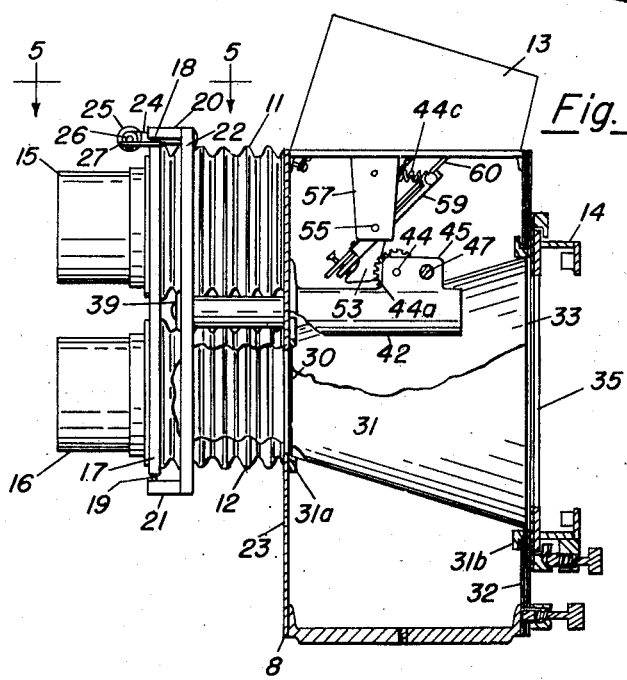
Fig. 4 is a view similar to that of Fig. 2, but showing the case of the camera in section, and certain parts broken away for the purpose of better illustration.
Figure 5:
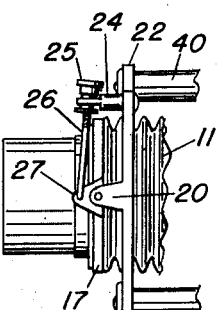
Fig. 5 is a view of the finder lens and connections, looking downwardly upon the same in the direction of arrows 5—5 as shown in Fig. 4.
Figure 6:
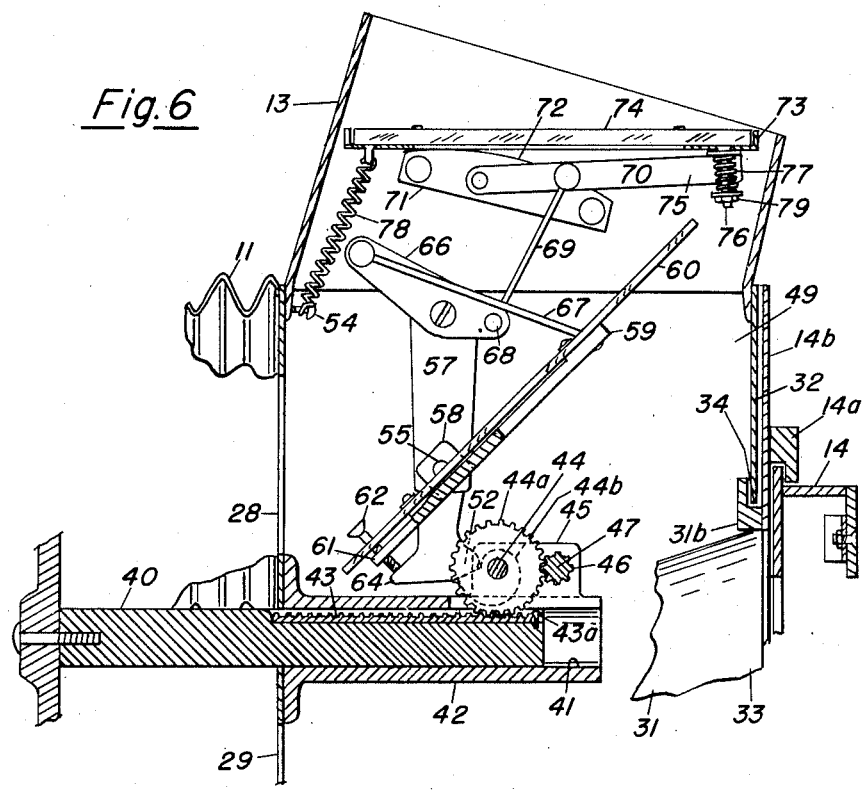
Fig. 6 is an enlarged section on line 6—6 of a portion of Fig. 1, looking in the direction of the arrows, and showing, in detail, the coordinating mechanism for actuating the focusing controls and adjusting the viewing screen.
Figure 7:
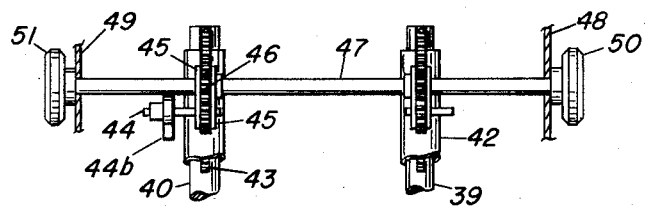
Fig. 7 is a longitudinal view of the main shaft and adjacent connections employed for actuating the focusing controls; and, Fig. 8 is an enlarged detailed view of the cam and cam follower and adjacent parts used for swinging the mirror upon its pivotal axis.
Figure 8:
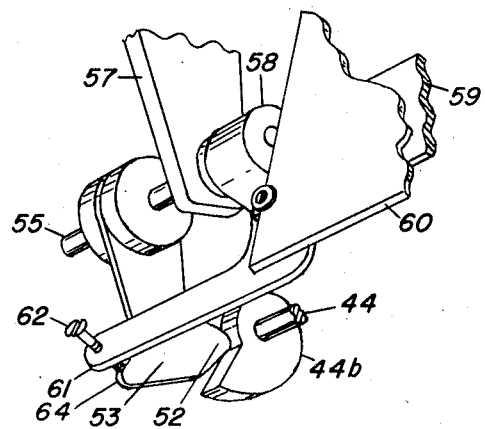

Extending between said lugs 57, 57, and pivotally mounted upon said trunnions 55, through a pair of trunnion seats 58, 58, is the cradle 59; said cradle being in the form of a flat plate with said seats integral therewith and extending upwardly from the sides thereof, and having firmly secured therebetween upon the top of said plate the flat mirror 60 facing upwardly thereon. Projecting at one side from the front of the lower end of the plate forming the said cradle and integral therewith is the arm 61, the outer end of which is in threaded engagement with the screw 62, the threaded end of which extends downwardly and is positioned to make adjusting contact with the toe 64 of the cam follower 44b. To hold the heel 52 of the cam follower 53 against the cam 44b, I provide the tension spring 44c, the ends of which are secured respectively to the top of the cradle 59 and to one of the lugs 57 (see Fig. 4).

Pivotally secured to one side of the upper end of said cradle 59 and to the outer end of the walking beam 66 is the rod 67; the said walking beam being pivotally mounted upon the upper portion of one of the lugs 57, and having its inner end 68 pivotally connected by the rod 69 to a pin secured to an intermediate part of the link 70. Also the outer end of the link 70 is pivotally connected with the central portion or intermediate part of the segmental rest 71, provided with the arcuate curved top 72, affixed to one side of the hood 13. A pair of said rests 71 are supplied, each secured to an opposite side of the hood and located in exact parallel relation one with the other; the two rests being positioned to permit the frame 73 enclosing the flat viewing screen 74 to ride arcuately thereon and to be inclined horizontally in respect to said hood. For purposes hereinafter set forth, the said segmental rests 71, 71, are positioned so that the arcuate curve of their said tops 72, 72, will find its center in the trunnions 55 upon which is pivotally mounted the axis of the cradle 59. As shown, the inner end 75 of the link 70 is secured to the upper edge of the frame 73 by the bolt 76, the threaded shank of which is provided with the compression spring 77, held in place by the nut 79. Also, the outer edge of the frame 73 is connected by the tension spring 78 to a pin or screw 54 secured to the bottom of the lower front side of the hood 13.

In order that all of these moving parts may be in the correct relation and made to act in required coordination, the finder lens 9, when being focused, must be positioned in relation to the mirror 60 so that at any part of the path of said lens the inner extension of the axis of said lens will always pass through the axis of the cradle 59 or the line of the centers of the trunnions 55. Also the relation between the radial or pivotal centers of walking beam 66, cradle 59, curve of segmental rest 71, link 70 and frame 73 are such that the viewing screen 74 is caused to move two angular degrees for each angular degree moved by the mirror upon the cradle 59; all being within the focusing range of the camera. The arrangement of parts being such that the relative movement of the face of the screen in respect to the face of the mirror will be in accordance with the equation $x'=F^2/x$, where $x$ is the distance from the object to be photographed to the first focal point of the lens, and $x'$ is the lens movement upon being refocussed on an object located at infinity.

Thus, the finder lens is positioned so that the light rays coming from the object to be photographed will be cast upon the surface of the mirror 60, and are reflected therefrom to the viewing screen 74, where said object will be observed by the photographer in its normal upright aspect when looking down through the hood from behind the camera. At the same time the exposure lens 10 is so positioned that the light rays coming from the said object and passing through the hollow of the cone 31 will be cast upon the photographic plate or film carried within the holder 14 at the rear of the camera. Both lenses by reason of their attachment to the plate 17 and sequential connections with the frame 22, focusing rods 39 and 40, gear and link train operated by the shaft 47, and handles 50, are equally and simultaneously moved towards or away to or from the object to be photographed.

In order to photograph an object away from the camera, the focusing of the two lenses 9 and 10 requires that they be pulled backwardly by the lens focusing rods 39 and 40 toward the photographic film or plate of the holder 14, with the result that the mirror 60 upon its cradle 59 will be caused to swing to the left, and the reflection of said object cast upon the viewing screen 74 caused to move toward the rear of the camera. On the other hand, to photograph an object close to the camera, the focusing of said lenses requires that they be thrust forward by the said focusing rods away from said photographic plate or film, with the result that the said mirror will be swung toward the right, and the reflection of said object upon said screen caused to move toward the front of the camera. Thus the changing in position of the reflected object cast upon the viewing screen effected by the foregoing means will compensate for the parallel spaced relationship of the two lenses and avoid parallax. Also since both of the lenses are of the same focal length, the said arrangement is such that a better focus of the exposure lens will be secured, and subject sought to be photographed will be more sharply defined upon said film or plate.

In order that the photographic plate or film may be set in horizontal, angular or vertical position, without having to turn the camera out of its normal horizontal emplacement, I pivotally mount the film holder 14 upon the rear wall 32 of the case 8. This is preferably accomplished by securing said holder to the frame 14a, affixed to the apertured back plate 14b, and by attaching said plate to the ring 31b, which is provided with the rim 31c and annular groove 31d rotatably engaging with the edge of the circular opening 34 in the rear wall of said case. Then by providing one edge of the plate 14b with spring stops 14c engaging with spaced openings or depressions 14d provided therefor in the adjacent wall 32, the said holder, carrying the plate or film, may be turned and held in the position desired without moving the camera.

My invention may be embodied in other specific forms without departing from the spirit or essential characteristics thereof. The present embodiment, as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In a twin lens photographic camera, the combination of finder and exposure lenses secured to a mounting in fixed parallel relation; focussing rods slidably mounted upon and extending through the front wall of the camera and into the hollow thereof, the outer ends of said rods being connected with said mounting and carrying the same thereon, and each of said rods having a rack secured thereto; a manually rotatable shaft extending between and mounted upon the side walls of said camera; a cam and gear train engaging with said racks and operatively connected with said shaft; a mirror pivotally mounted within said camera; a cam follower secured to and adapted to turn said mirror upon its mounting and located to be actuated by said cam, said mirror being positioned to receive the light rays from said finder lens with the pivotal axis of said mirror at right angles to the axis of said lens; a hood opening into the top of said camera, and a flat viewing screen mounted within said hood to move in an arcuate path therein; the center of curvature of said path being coincident with the pivotal axis of said mirror; and link and lever means mounted within said camera and connecting said mirror and screen and coordinating the relative movement thereof so that the said screen will always turn through an angle twice as great as that turned by said mirror; said link and lever means cooperating with said lenses and operating mechanism to reproduce upon said screen without parallax the same view as that cast by the exposure lens upon the sensitized film or plate of the camera.

2. In a twin lens photographic camera, the combination of finder and exposure lenses; a carrier with said lenses mounted thereon in fixed parallel relation and adapted to move said lenses simultaneously to focus the same upon the object to be photographed; a mirror pivotally mounted within the camera, said mirror being positioned to receive the light rays from said finder lens with the pivotal axis of said mirror at right angles to the axis of said lens; a hood opening into the top of the camera, and a flat viewing screen mounted within said hood to move in an arcuate path therein; the center of curvature of said path being coincident with the pivotal axis of said mirror, and link and lever means mounted within the camera and connecting said mirror and screen and adapted to coordinate the relative movement thereof, so that the said screen will always turn through an angle twice as great as that turned by said mirror, and so that the plane of the screen is always perpendicular to the paraxial pencil of rays coming from the finder lens and reflected upwardly upon the screen.

3. In a twin lens photographic camera, the combination of finder and exposure lenses; a carrier with said lenses mounted thereon in fixed parallel relation and adapted to move said lenses simultaneously to focus the same upon the object to be photographed; a mirror pivotally mounted within the camera, said mirror being positioned to receive the light rays from said finder lens with the pivotal axis of said mirror at right angles to the axis of said lens; a hood opening into the top of the camera, and a flat viewing screen mounted within said hood to move in an arcuate path therein; the center of curvature of said path being coincident with the pivotal axis of said mirror; and link and lever means mounted within the camera and connecting said mirror and screen and adapted to coordinate the relative movement thereof in accordance with the equation $x' = F^2/x$, where $x$ is the distance from the object to be photographed to the first focal point of the lens, and $x'$ is the lens movement upon being refocussed on an object located at infinity.

JOHN H. McILROY.

REFERENCES CITED

The following references are of record in the file of this patent:

UNITED STATES PATENTS

| Number | Name | Date |
|---|---|---|
| 1,819,844 | Ross | Aug. 18, 1931 |
| 1,998,568 | Barenyi | Apr. 23, 1935 |
| 2,297,401 | Gabler et al. | Sept. 29, 1942 |

FOREIGN PATENTS

| Number | Country | Date |
|---|---|---|
| 651,143 | Germany | Oct. 8, 1937 |
| 765,541 | France | Mar. 22, 1940 |
| 521,452 | Great Britain | May 22, 1940 |